(12) United States Patent  
Harmsen et al.

(10) Patent No.: US 9,016,046 B2  
(45) Date of Patent: Apr. 28, 2015

(54) INTERNAL COMBUSTION ENGINE WITH EXHAUST-GAS AFTERTREATMENT ARRANGEMENT AND METHOD FOR OPERATING AN INTERNAL COMBUSTION ENGINE OF SAID TYPE

(71) Applicant: Ford Global Technologies, LLC, Dearborn, MI (US)

(72) Inventors: Jan Harmsen, Simpelveld (NL); Frank Linzen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 13/733,083

(22) Filed: Jan. 2, 2013

(65) Prior Publication Data  
US 2013/0167510 A1 Jul. 4, 2013

(30) Foreign Application Priority Data  
Jan. 2, 2012 (DE) .......................... 10 2012 200 000

(51) Int. Cl.  
*F01N 3/20* (2006.01)  
*F01N 3/10* (2006.01)  
(Continued)

(52) U.S. Cl.  
CPC ................ F01N 3/10 (2013.01); *F01N 3/2892* (2013.01); *F01N 3/2073* (2013.01); *F01N 2900/1614* (2013.01); *F01N 2410/12* (2013.01); *F01N 2240/20* (2013.01); *F01N 2610/03* (2013.01); *Y02T 10/144* (2013.01); F01N 3/208 (2013.01); *F02B 37/00* (2013.01); F01N 3/035 (2013.01); *F01N 2610/02* (2013.01); *Y02T 10/24* (2013.01); F01N 13/009 (2014.06)  
(Continued)

(58) Field of Classification Search  
CPC ..... F01N 3/035; F01N 3/0814; F01N 3/0878; F01N 3/2073; F01N 3/208; F01N 3/2892; F01N 13/009; F01N 2240/20; F01N 2410/12; F01N 2430/06; F01N 2610/02; F01N 2610/03; F01N 2610/146; F01N 2900/1411; F01N 2900/1614; Y02T 10/144  
USPC .......... 60/274, 286, 287, 288, 289, 290, 291, 60/295, 297, 299, 301, 303, 311, 324  
See application file for complete search history.

(56) References Cited  
U.S. PATENT DOCUMENTS 6,820,417 B2 * 11/2004 May et al. ................... 60/297  
2004/0003588 A1 * 1/2004 Nakatani et al. ............ 60/286  
(Continued)

FOREIGN PATENT DOCUMENTS

DE 19626837 A1 1/1997  
DE 19740702 C1 11/1998  
(Continued)

*Primary Examiner* — Thomas Denion  
*Assistant Examiner* — Jorge Leon, Jr.  
(74) *Attorney, Agent, or Firm* — Greg Brown; Alleman Hall McCoy Russell & Tuttle LLP

(57) ABSTRACT

A method, comprising purging a storage catalytic converter of stored NOx by diverting only a portion of incoming exhaust flow around the catalytic device while increasing injection of reductant to the storage catalytic converter; and responsive to the diverting, adjusting injection of an ammonia-containing fluid into recombined exhaust flow upstream of an SCR catalytic converter. Bypass of the storage catalytic converter reduces available oxygen and air flow through the storage catalytic converter, providing a more advantageous environment for reduction of $NO_x$ in the storage catalytic converter.

17 Claims, 3 Drawing Sheets

(51) Int. Cl.
  *F01N 3/035* (2006.01)
  *F01N 13/00* (2010.01)
  *F01N 3/28* (2006.01)
  *F01N 3/08* (2006.01)
  *F02B 37/00* (2006.01)

(52) U.S. Cl.
  CPC ...... *F01N 2430/06* (2013.01); *F01N 2610/146* (2013.01); *F01N 3/0814* (2013.01); *F01N 2900/1411* (2013.01); *F01N 3/0842* (2013.01); *F01N 3/0878* (2013.01);

(56) References Cited

U.S. PATENT DOCUMENTS

| | | | |
|---|---|---|---|
| 2004/0025499 A1* | 2/2004 | Nakatani et al. | 60/286 |
| 2004/0139730 A1* | 7/2004 | Taylor et al. | 60/275 |
| 2006/0010857 A1* | 1/2006 | Hu et al. | 60/286 |
| 2006/0010859 A1* | 1/2006 | Yan et al. | 60/286 |
| 2006/0179823 A1* | 8/2006 | Hinz et al. | 60/288 |
| 2006/0213187 A1 | 9/2006 | Kupe et al. | |
| 2006/0260297 A1* | 11/2006 | Koch | 60/286 |
| 2007/0175206 A1* | 8/2007 | Mital et al. | 60/286 |
| 2007/0271908 A1* | 11/2007 | Hemingway et al. | 60/286 |
| 2008/0289321 A1* | 11/2008 | Lu et al. | 60/299 |
| 2009/0308057 A1* | 12/2009 | Fresnet et al. | 60/287 |
| 2010/0043399 A1* | 2/2010 | Stroia et al. | 60/274 |
| 2010/0077736 A1* | 4/2010 | Morishima et al. | 60/288 |
| 2011/0173953 A1* | 7/2011 | Neels et al. | 60/274 |

FOREIGN PATENT DOCUMENTS

| | | |
|---|---|---|
| DE | 10128414 A1 | 12/2002 |
| DE | 102007042448 A1 | 3/2009 |

\* cited by examiner

INTERNAL COMBUSTION ENGINE WITH EXHAUST-GAS AFTERTREATMENT ARRANGEMENT AND METHOD FOR OPERATING AN INTERNAL COMBUSTION ENGINE OF SAID TYPE

CROSS REFERENCE TO RELATED APPLICATIONS

The present application claims priority to German Application 102012200000.3, filed on Jan. 2, 2012, the entire contents of which are hereby incorporated by reference for all purposes.

TECHNICAL FIELD

The present disclosure relates to exhaust gas aftertreatment for internal combustion engines.

BACKGROUND AND SUMMARY

Exhaust gases from internal combustion engines contain nitrogen oxides $NO_x$ levels which are substantially larger than legislatively allowed levels. To reduce nitrogen oxides $NO_x$ emissions some kind of nitrogen oxides $NO_x$ aftertreatment is required. The two most feasible technologies are nitrogen oxide storage catalytic converter (LNT—Lean $NO_x$ Trap) and selective catalytic converters, so-called SCR (Selective Catalytic Reduction) both of which are described below in greater detail. A disadvantage of using LNT is the need for local rich ($\lambda<1$) (e.g. fuel is added to the air-fuel mixture) conditions to provide an oxygen poor environment for reduction of nitrogen oxides $NO_x$. SCR additionally uses an additive to produce environmental conditions appropriate for reducing nitrogen oxides $NO_x$. In the case of SCR, an ammonia $NH_3$ compound is commonly added to produce a reducing environment. The present disclosure describes a system and method for nitrogen oxides $NO_x$ aftertreatment which avoids both the rich operation of an engine cylinder and the addition of an ammonia $NH_3$ compound.

The disclosure relates to an internal combustion engine having at least one cylinder which has at least one outlet opening for the discharge of the exhaust gases via the exhaust-gas discharge system, in which:
  each outlet opening is adjoined by an exhaust line, and
  a storage catalytic converter for the reduction of the nitrogen oxides in the exhaust gas is arranged in the exhaust-gas discharge system.

The disclosure also relates to a method for operating an internal combustion engine of said type.

An internal combustion engine of the above-stated type is used for example as a drive for a motor vehicle. Within the context of the present disclosure, the expression "internal combustion engine" encompasses in particular diesel engines, but also applied-ignition engines and also hybrid internal combustion engines which operate with a hybrid combustion process.

According to known methods to reduce pollutant emissions, internal combustion engines are equipped with various exhaust-gas aftertreatment systems. Even without additional measures, oxidation of the unburned hydrocarbons (HC) and of carbon monoxide (CO) takes place during the expansion and discharge of the cylinder charge at a sufficiently high temperature level, and in the presence of sufficiently large oxygen quantities. However, special reactors and/or filters must generally be provided in the exhaust tract in order to reduce the pollutant emissions under all operating conditions.

In applied-ignition engines, catalytic reactors are used which, through the use of catalytic materials increase the rate of certain reactions, ensure oxidation of HC and CO even at low temperatures. If nitrogen oxides $NO_x$ are also to be reduced, this may be achieved through the use of a three-way catalytic converter. However, use of a three-way catalytic converter requires stoichiometric operation ($\lambda \approx 1$) of the applied-ignition engine within narrow limits. Here, the nitrogen oxides $NO_x$ are reduced by means of the non-oxidized exhaust-gas components, specifically the carbon monoxides and the unburned hydrocarbons, wherein said exhaust-gas components are oxidized at the same time.

In internal combustion engines which are operated with an excess of air, for example diesel engines, but also applied-ignition engines which operate in the lean-burn mode or direct-injection applied-ignition engines, the nitrogen oxides $NO_x$ in the exhaust gas cannot be reduced owing to the lack of a reducing agent.

To reduce the nitrogen oxides, use is therefore made of selective catalytic converters, so-called SCR (Selective Catalytic Reduction) catalytic converters, in which a reducing agent is purposely introduced into the exhaust gas in order to selectively reduce the nitrogen oxides. SCR catalytic converters use ammonia and urea as reducing agents. However, SCR catalytic converters may also use unburned hydrocarbons as a reducing agent. The latter is also referred to as HC enrichment, wherein the unburned hydrocarbons can be introduced directly into the exhaust-gas discharge system. Additionally, unburned hydrocarbons can also be supplied by means of engine-internal measures, for example by means of a post-injection of additional fuel into the combustion chamber after the actual combustion. In the present disclosure the post-injected fuel should not be ignited in the combustion chamber by the main combustion but rather should be introduced into the exhaust-gas discharge system during the charge exchange.

The nitrogen oxide emissions may also be reduced by means of a nitrogen oxide storage catalytic converter (LNT—Lean $NO_x$ Trap). In using an LNT, the nitrogen oxides are absorbed initially, during a lean-burn mode of the internal combustion engine. That is to say the nitrogen oxides are collected and stored in the catalytic converter before being reduced during a regeneration phase. In a regeneration phase nitrogen oxides are reduced by means of substoichiometric operation (for example, $\lambda<0.95$) of the internal combustion engine. With a lack of oxygen the unburned hydrocarbons in the exhaust gas serve as reducing agents. Further, engine-internal possibilities for the reducing agent enrichment of the exhaust gas, in particular of unburned hydrocarbons, are exhaust-gas recirculation (EGR) and, in the case of diesel engines, throttling in the intake tract. As stated above, with regard to SCR catalytic converters, an enrichment of the exhaust gas with unburned hydrocarbons may also be realized by means of a post-injection of fuel, which may also be regarded as an engine-internal measure. A disadvantage of said approach is oil thinning. It is possible to dispense with engine-internal measures if the reducing agent is introduced directly into the exhaust-gas discharge system, for example by means of an injection of additional fuel upstream of the LNT as is an object of the present disclosure.

During the regeneration phase, the nitrogen oxides $NO_x$ are released and converted substantially into nitrogen dioxide $N_2$, carbon dioxide $CO_2$ and water $H_2O$. The temperature of the storage catalytic converter should preferably lie in a temperature window between 200° C. and 450° C., such that a fast reduction is ensured and no desorption without conversion of the re-released nitrogen oxides NOx takes place. Such effects may be triggered by excessively high temperatures.

One difficulty in the use of an LNT arises from the sulfur contained in the exhaust gas. The sulfur is absorbed in the LNT and must be regularly removed by means of desulfurization. For this purpose, the LNT must be heated to high temperatures, conventionally between 600° C. and 700° C., and supplied with a reducing agent. Owing to the high temperatures required for the desulfurization, it is expedient for the storage catalytic converter to be positioned in as close-coupled a manner as possible, that is to say as close as possible to the outlet of the internal combustion engine, such that the exhaust gases are given little distance and time to cool down.

As described in detail above, both exhaust-gas aftertreatment systems, the SCR catalytic converter and the storage catalytic converter (LNT), require a reducing agent for the reduction of the nitrogen oxides $NO_x$.

The use of fuel, that is to say of unburned hydrocarbons, as reducing agent injected into the combustion chamber opposes the basic aim of minimizing fuel consumption and improving the efficiency of the internal combustion engine. Furthermore, with increasing fuel consumption, the emissions of carbon dioxide $CO_2$ also increase.

The use of ammonia as reducing agent requires the provision of an additional vessel for storing the ammonia, or urea from which ammonia $NH_3$ is formed during the course of a thermolytic reaction.

Both types of reducing agent strategy, burning rich, and injection of ammonia $NH_3$, constitute operating liquids which are consumed, entail costs and are harmful to the environment to a greater or lesser extent.

For the stated reasons, it is therefore advantageous to use as little reducing agent as possible, which may also be achieved through the most effective possible utilization of the reducing agent which is used. The present disclosure details an internal combustion engine having at least one cylinder which has at least one outlet opening for discharge of exhaust gases via an exhaust gas discharge system, comprising: an exhaust line adjoining each outlet opening; and a storage catalytic converter for reduction of nitrogen oxides in the exhaust gas is arranged in the exhaust-gas discharge system; wherein a bypass line for bypassing the storage catalytic converter is provided, the bypass line branches off from the exhaust-gas discharge system upstream of the storage catalytic converter so as to form a first junction and opens into the exhaust-gas discharge system again downstream of the storage catalytic converter so as to form a second junction; a device for introducing reducing agent into the exhaust-gas discharge system being provided between the first junction and the storage catalytic converter, and a shut-off element is provided for controlling the exhaust-gas mass flow conducted through the storage catalytic converter.

The present disclosure provides an exhaust gas bypass line which bypasses the storage catalytic converter. Conducting exhaust gas flow away from the storage catalytic converter reduces air flow to the converter during cleaning. Reducing air flow in the storage catalytic converter during cleaning reduces oxygen available to the storage catalytic converter. With the addition of a reducing agent, in this case fuel from the device for introducing reducing agent, into the exhaust line upstream of the storage catalytic converter, in addition to reducing available oxygen, conditions are improved for reducing nitrogen oxides NOx. Furthermore, limiting exhaust gas flow during cleaning limits air velocity through the storage catalytic converter further improving conditions for reduction of nitrogen oxides $NO_x$. Injection of fuel into the exhaust-gas discharge system directly is advantageous over rich operation of the engine as the method of the present disclosure can be performed at any engine speed or load. Furthermore, unburned hydrocarbons HC passed through the storage catalytic converter during cleaning may serve as a reducing agent to an SCR downstream of the catalytic converter.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
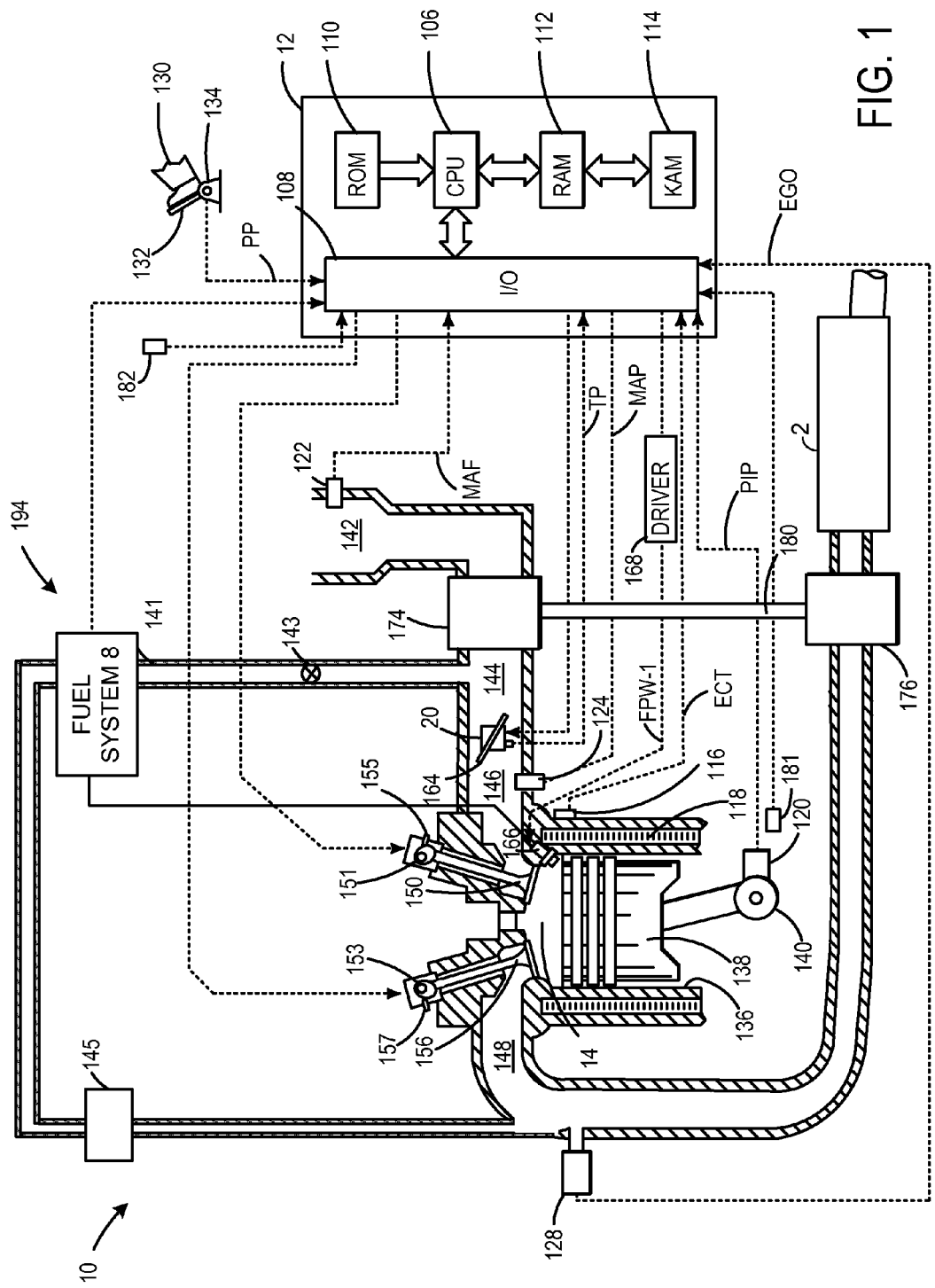
FIG. 1 shows a schematic depiction of an internal combustion engine.

It is an object of the present disclosure to provide an internal combustion engine, which is optimized with regard to the combustion of reducing agent for the reduction of the nitrogen oxides in the exhaust gas.

It is a further sub-object of the present disclosure to specify a method for operating an internal combustion engine of said type.

The first sub-object is achieved by means of an internal combustion engine having at least one cylinder, which has at least one outlet opening for the discharge of the exhaust gases via the exhaust-gas discharge system, in which:

each outlet opening is adjoined by an exhaust line, and a storage catalytic converter for the reduction of the nitrogen oxides in the exhaust gas is arranged in the exhaust-gas discharge system, and wherein a bypass line for bypassing the storage catalytic converter is provided, which bypass line branches off from the exhaust-gas discharge system upstream of the storage catalytic converter so as to form a first junction and opens into the exhaust-gas discharge system again downstream of the storage catalytic converter so as to form a second junction, a device for introducing reducing agent into the exhaust-gas discharge system being provided between the first junction and the storage catalytic converter, and a shut-off element is provided for controlling the exhaust-gas mass flow conducted through the storage catalytic converter.

Embodiments of the internal combustion engine are advantageous in which the device for introducing reducing agent is a device for introducing fuel, that is to say fuel is used as reducing agent. Hydrogen may however also be used as reducing agent. It will hereinafter, in the description of the disclosure, be assumed that fuel is used as reducing agent.

According to the disclosure, a storage catalytic converter is utilized for the reduction of the nitrogen oxides, wherein the fuel which serves as reducing agent is introduced directly into the exhaust-gas discharge system upstream of the storage catalytic converter.

According to the disclosure, the storage catalytic converter is equipped with a bypass line which serves for bypassing the storage catalytic converter, which branches off from the exhaust-gas discharge system upstream of the storage catalytic converter and which opens into the exhaust-gas discharge system again downstream of the storage catalytic converter.

The bypass line makes it possible, in interaction with a shut-off element, for a part of the untreated exhaust gas discharged from the at least one cylinder to be conducted past the storage catalytic converter. The remaining exhaust-gas partial flow passes through the storage catalytic converter and serves as a carrier flow for the fuel which is introduced as reducing agent by means of the device into the exhaust-gas discharge system in order, in the catalytic converter, to reduce the nitrogen oxides released during the cleaning.

The structural configuration of the exhaust-gas discharge system, that is to say the equipping of the storage catalytic converter with a bypass, and also the HC enrichment of only a part of the exhaust gas, have the effect that the internal combustion engine according to the disclosure requires relatively little fuel for the cleaning of the catalytic converter. The technical interactions or reasons will be discussed briefly below.

If the exhaust-gas flow conducted through the storage catalytic converter is reduced, the oxygen mass conducted through the catalytic converter also decreases. Since firstly the free oxygen $O_2$ in the exhaust gas must be consumed before released nitrogen oxides can be reduced by means of the fuel introduced, the fuel mass required for cleaning the catalytic converter also decreases with the reduced oxygen mass.

A further technical effect of the measure according to the disclosure of reducing the exhaust-gas flow conducted through the storage catalytic converter during the cleaning process is manifested in a reduced spatial velocity. Since the exhaust-gas flow conducted through the catalytic converter is reduced, the exhaust gas conducted through the catalytic converter has a longer residence time in the catalytic converter, such that more time is available or provided for the fuel in the exhaust gas to react with the nitrogen oxides, that is to say reduce the nitrogen oxides.

The first sub-object on which the disclosure is based is achieved by means of the internal combustion engine according to the disclosure. An internal combustion engine is described below which is optimized with regard to the consumption of reducing agent for the reduction of nitrogen oxides in the exhaust gas.

Referring now to the figures, FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system.

Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Embodiments of the internal combustion engine are advantageous in which at least one exhaust-gas turbocharger is provided for the purpose of supercharging, wherein the turbine of the at least one exhaust-gas turbocharger is arranged upstream of the first junction in the exhaust-gas discharge system.

Supercharging is a suitable means for increasing the power of an internal combustion engine while maintaining an unchanged swept volume, or for reducing the swept volume while maintaining the same power. For the same vehicle boundary conditions, it is thus possible to shift the load collective toward higher loads, at which the specific fuel consumption is lower. Supercharging consequently assists in minimizing fuel consumption, that is to say improving the efficiency of the internal combustion engine. With suitable configuration of the supercharging, it is also possible to obtain advantages with regard to exhaust-gas emissions.

For supercharging, use is often made of an exhaust-gas turbocharger, in which a compressor and a turbine are arranged on the same shaft. The hot exhaust-gas flow is supplied to the turbine via an exhaust-gas discharge system and expands in said turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the cylinders is obtained.

The advantages of the exhaust-gas turbocharger for example in relation to conventional mechanical chargers are that no mechanical connection exists or is required between the charger and internal combustion engine.

With regard to the arrangement of the exhaust-gas turbocharger, it is sought to arrange the turbine as close as possible to the outlet of the internal combustion engine, that is to say in a close-coupled configuration, in order thereby to be able to make optimum use of the exhaust-gas enthalpy of the hot exhaust gases, which is determined significantly by the exhaust-gas pressure and the exhaust-gas temperature, and to ensure a fast response behavior of the turbocharger. It is basically sought to minimize the thermal inertia and the volume of the line system between the outlet openings on the cylinders and the turbine, which may be achieved by reducing the mass and the length of that part. In the present case, it is expedient for the turbine of the at least one exhaust-gas turbocharger to be arranged upstream of the first junction in the exhaust-gas discharge system.

Furthermore, in the context of the present disclosure no turbocharger may be present. However, in the case, such as engine 10, where a turbocharger is present, the turbine will be located upstream of the first junction point of the exhaust-gas discharge system 2 (further described below in reference to FIG. 2).

Exhaust passage 148 may receive exhaust gases from other cylinders of engine 10 in addition to cylinder 14. Exhaust gas sensor 128 is shown coupled to exhaust passage 148 upstream of exhaust-gas discharge system 2. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Exhaust-gas discharge system 2 in the context of the present disclosure consists of a storage catalytic converter, a coated particle filter, and an SCR converter (described in greater detail in FIG. 2).

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a high pressure fuel system 8 including fuel tanks, fuel pumps, and a fuel rail. Alternatively, fuel may be delivered by a single stage fuel pump at lower pressure. Further, the fuel tanks may have a pressure transducer providing a signal to controller 12.

It will be appreciated that while in one embodiment, the engine may be operated by injecting fuel via a single direct injector; in alternate embodiments, the engine may be operated by using two injectors (a direct injector 166 and a port injector) and varying a relative amount of injection from each injector.

Fuel may be delivered by the injector to the cylinder during a single cycle of the cylinder. Further, the distribution and/or relative amount of fuel delivered from the injector may vary with operating conditions, such as engine temperature, ambient temperature, etc., as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), etc. Furthermore, the cylinders may have a spark plug and may be configured to combust gasoline or another fuel.

Engine 10 may further include an EGR system 194 including one or more exhaust gas recirculation passages for recirculating a portion of exhaust gas from the engine exhaust to the engine intake. As such, by recirculating some exhaust gas, an engine dilution may be affected which may increase engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 144 may be varied by controller 12 via EGR valve 143. Further, an EGR sensor 145 may be arranged within the EGR passage and may provide an indication of one or more pressure, temperature, and concentration of the exhaust gas.

It will be appreciated that while the embodiment of FIG. 1 shows high pressure (HP-EGR) being provided via an HP-EGR passage coupled between the engine intake downstream of the turbocharger compressor and the engine exhaust upstream of the turbine, in alternate embodiments, the engine may be configured to also provide flow pressure EGR (LP-EGR) via an LP-EGR passage coupled between the engine intake upstream of the compressor and the engine exhaust downstream of the turbine. In one example, an LP-EGR flow may be provided under conditions such as the absence of boost provided by the turbocharger, while an HP-EGR flow may be provided during conditions such as in the presence of turbocharger boost and/or when an exhaust gas temperature is above a threshold. When distinct HP-EGR and LP-EGR passages are included, the respective EGR flows may be controlled via adjustments to respective EGR valves.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. For example, the ROM 110, RAM 112, or KAM 114, alone or in combination, may be representative of computer readable medium that is programmable to hold instructions that are executable by the processor 106 to control operation of engine 10. Controller 12 may receive various signals from sensors coupled to engine 10, in addition to those signals previously discussed, including measurement of inducted mass air flow (MAF) from mass air flow sensor 122; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Furthermore, controller 12 may receive signals that may be indicative of various temperatures related to the engine 10. For example, engine coolant temperature (ECT) from temperature sensor 116 coupled to cooling sleeve 118 may be sent to controller 12. In some embodiments, sensor 128 may provide an indication of exhaust temperature to controller 12. Sensor 181 may provide an indication of oil temperature or oil viscosity to controller 12. Sensor 182 may provide an indication of ambient temperature to controller 12. One or more of these sensors may provide an indication of an engine temperature that may be used by controller 12 to control operation of the engine. For example, the engine temperature and/or the ambient temperature may be used to control fuel injector 166 in conjunction with EGR valve 143 to provide increased EGR while maintaining stable combustion, under some conditions, as will be discussed in further detail below.

In one example, controller 12 includes a processor and computer-readable medium having instructions that when executed by the processor: supply a first EGR amount to the cylinder 14 via the EGR system 194 at a first engine temperature and a first engine speed and load. Further, at the first engine speed and load, as engine temperature increases from the first engine temperature to a second engine temperature, inject a first fuel amount after exhaust valve closing and before intake valve opening via the fuel injector 166 while supplying a second EGR amount to the cylinder that is greater than the first EGR amount after intake valve opening via the EGR system 194.

Figure 2:
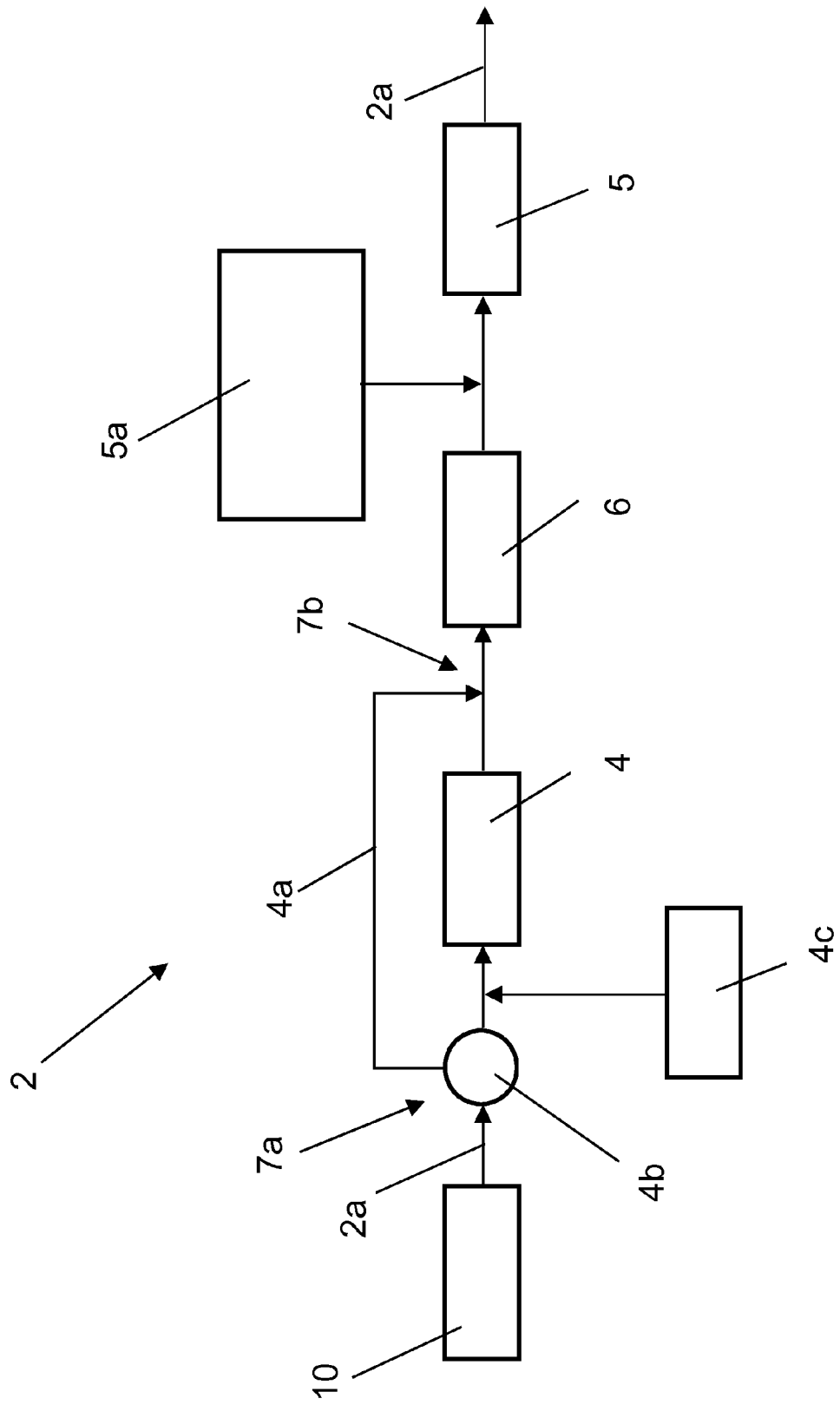
FIG. 2 schematically shows an embodiment of the internal combustion engine together with exhaust-gas discharge system.

FIG. 2 schematically depicts an embodiment of an exhaust-gas discharge system of the present disclosure. The exhaust-gas discharge system 2 is configured to discharge the exhaust gases produced by internal combustion engine 10, which may be substantially similar to internal combustion engine 10 shown in FIG. 1.

In an exhaust line 2a of the exhaust-gas discharge system 2 there are arranged various exhaust-gas aftertreatment systems, specifically a storage catalytic converter 4 and an SCR catalytic converter 5 for the reduction of the nitrogen oxides and a coated particle filter 6 for reducing the particle emissions.

The exhaust gas discharged from the cylinders of the internal combustion engine 10 is firstly supplied via the exhaust line 2a to the storage catalytic converter 4. A bypass line 4a for bypassing the storage catalytic converter 4 is provided, the bypass line branches off from the exhaust line 2a upstream of the storage catalytic converter 4 so as to form a first junction 7a and opens into the exhaust line 2a again downstream of the storage catalytic converter 4 so as to form a second junction 7b.

When the bypass line is in use any $NO_x$ emissions in the line that are directed away from the storage catalytic converter (LNT) will be converted by the SCR converter and not released into the environment.

For the introduction of reducing agent into the exhaust line 2a, a device 4c is provided between the first junction 7a and the storage catalytic converter 4. A shut-off element 4b is arranged at the first junction 7a for adjusting the exhaust-gas mass flow conducted through the storage catalytic converter 4.

In an alternate embodiment, the shut-off element may be arranged in the bypass line.

The device 4c is configured to introduce reducing agent into the exhaust line 2a. The device may be a fuel injector, a vaporizer, or another existing device which is capable of introducing a reducing agent (e.g. fuel) into the exhaust line 2a.

In a first working position of the shut-off element 4b, the bypass line 4a is blocked, and all of the exhaust gas is conducted through the storage catalytic converter 4. If the shut-off element 4b is moved into a second working position, the exhaust gas is conducted predominantly through the bypass line 4a, and the storage catalytic converter 4 can be cleaned. The shut-off element may be adjustable between a first working position, in which the bypass line is completely blocked, and a second working position, in which the exhaust gas is conducted predominantly through the bypass line. In the second working position, more than three quarters of the exhaust gas may be conducted through the bypass line.

Downstream of the second junction 7b is provided the SCR catalytic converter 5 by means of which, during the cleaning of the storage catalytic converter 4, the nitrogen oxides in the exhaust gas conducted past the storage catalytic converter 4 are reduced. The SCR catalytic converter 5, is equipped with a device 5a for introducing reducing agent, which device is provided upstream of the SCR catalytic converter 5.

This second device for introducing reducing agent upstream of the SCR may be excluded in the present disclosure. It is possible that unburnt hydrocarbons HC passing through the storage catalytic converter 4 may adequately serve as reducing agents in the SCR. However, it may be advantageous to provide a second device for introducing reducing agent. This second device is downstream of the storage catalytic converter (LNT) and immediately upstream of the SCR and may be configured to provide $NH_3$ containing liquid (e.g. urea or AdBlue) to the exhaust line 2a. These compounds reduce the NOx contained in the SCR.

The coated particle filter 6 is arranged between the second junction 7b and the SCR catalytic converter 5. The particle filter may be catalytically coated for the oxidation of unburned hydrocarbons HC and carbon monoxide CO.

In an embodiment specific to a diesel engine, during normal superstoichiometric operation of the internal combustion engine, the shut-off element is in the first working position, in which all of the exhaust gas is conducted through the storage catalytic converter. Here, the nitrogen oxides of the internal combustion engine are absorbed and stored in the catalytic converter. To perform cleaning of the catalytic converter, the shut-off element is then moved into the second working position in order to reduce the exhaust-gas flow conducted through the catalytic converter and save reducing agent.

In the above embodiment, in the second working position, the exhaust gas is conducted predominantly through the bypass line, that is to say more than half of the exhaust gas is conducted through the bypass line.

The shut-off element may be a valve, in particular a ⅔ directional valve, or else a pivotable or rotatable flap. Embodiments are advantageous in which the shut-off element can be electrically, hydraulically, pneumatically, mechanically or magnetically controlled, preferably by means of an engine controller, such as engine controller 12 shown in FIG. 1. Said shut-off element may be capable of two-stage or multi-stage switching or may be continuously adjustable.

Embodiments of the internal combustion engine are advantageous in which the shut-off element is arranged in the bypass line. The closed shut-off element, when in the first working position, completely blocks the bypass line. In the second working position, the bypass line is opened up to a greater or lesser extent by means of an at least partial opening of the shut-off element.

The apportionment of the exhaust-gas flow is influenced by the degree of opening of the shut-off element and the flow resistance to which the exhaust gas is subjected by the catalytic converter.

Embodiments of the internal combustion engine are however also advantageous in which the shut-off element is arranged at the first junction in the exhaust-gas discharge system. Said embodiment ensures that the magnitude of the two exhaust-gas partial flows is primarily determined by the position or the switching state of the shut-off element.

The exhaust gas conducted past the catalytic converter during the cleaning of the storage catalytic converter necessitates the provision, downstream, of a further exhaust-gas aftertreatment system for the reduction of the nitrogen oxides. It is possible for a second storage catalytic converter to be arranged in the exhaust-gas discharge system, which second catalytic converter absorbs and stores the nitrogen oxides in the exhaust gas which is conducted through the bypass during the cleaning process.

In the embodiment shown in FIG. 2 an SCR catalytic converter is present for the reduction of the nitrogen oxides in the exhaust gas and is arranged in the exhaust-gas discharge system downstream of the second junction. With regard to the conversion of the nitrogen oxides, the SCR catalytic converter is based on a different principle. No exhaust-gas constituents are absorbed or stored, and in particular no sulfur is accumulated, the removal of which from a second storage catalytic converter would require high temperatures, which are difficult to generate downstream of the close-coupled first storage catalytic converter. Thus an SCR catalytic converter may be well suited to placement downstream of the second junction.

In internal combustion engines in which an SCR catalytic converter is arranged in the exhaust-gas discharge system, embodiments are advantageous in which a device for introducing reducing agent into the exhaust-gas discharge system is provided upstream of the SCR catalytic converter and preferably downstream of the second junction, that is to say between the second junction and the SCR catalytic converter.

As already stated, in the case of an SCR catalytic converter, ammonia or urea or else unburned hydrocarbons may be used as reducing agent, wherein ammonia in particular has proven to be a suitable reducing agent.

Embodiments of the internal combustion engine are therefore advantageous in which the device for introducing reducing agent serves for introducing ammonia as reducing agent.

It is basically possible for ammonia $NH_3$ to be introduced directly into the exhaust-gas discharge system. Ammonia which is used as reducing agent may also be generated during the cleaning of the LNT, such that the need for a separate device is eliminated, as will be explained in conjunction with the method according to the disclosure.

Owing to its toxicity, ammonia is preferably not stored in motor vehicles, and provided as reducing agent, in pure form. Rather, urea is often used as a starting product for producing ammonia.

In the case of urea being provided for producing ammonia, it is possible in known methods to make a distinction between two approaches which differ fundamentally from one another. On the one hand, the urea may be stored and provided in liquid form as an aqueous solution. Secondly, it is possible for the urea to be provided in solid form, wherein urea in solid form is less voluminous.

Embodiments of the internal combustion engine are advantageous in which a particle filter for reducing the particle emissions is arranged in the exhaust-gas discharge system downstream of the second junction.

In the case of internal combustion engines in which an SCR catalytic converter is also arranged in the exhaust-gas discharge system downstream of the second junction, embodiments are advantageous in which the particle filter is arranged between the second junction and the SCR catalytic converter.

Embodiments of the internal combustion engine are advantageous in which the particle filter is catalytically coated for the oxidation of unburned hydrocarbons HC and carbon monoxide CO.

The second sub-object, specifically that of specifying a method for operating an internal combustion engine of an above-described type, is achieved by means of a method for the purpose of cleaning the storage catalytic converter, in which:
the shut-off element is moved from a first working position, in which the bypass line is blocked, into a second working position, in which the exhaust gas is conducted predominantly through the bypass line, and
the exhaust gas which is conducted through the storage catalytic converter is enriched with reducing agent by means of an actuation of the device.

Figure 3:
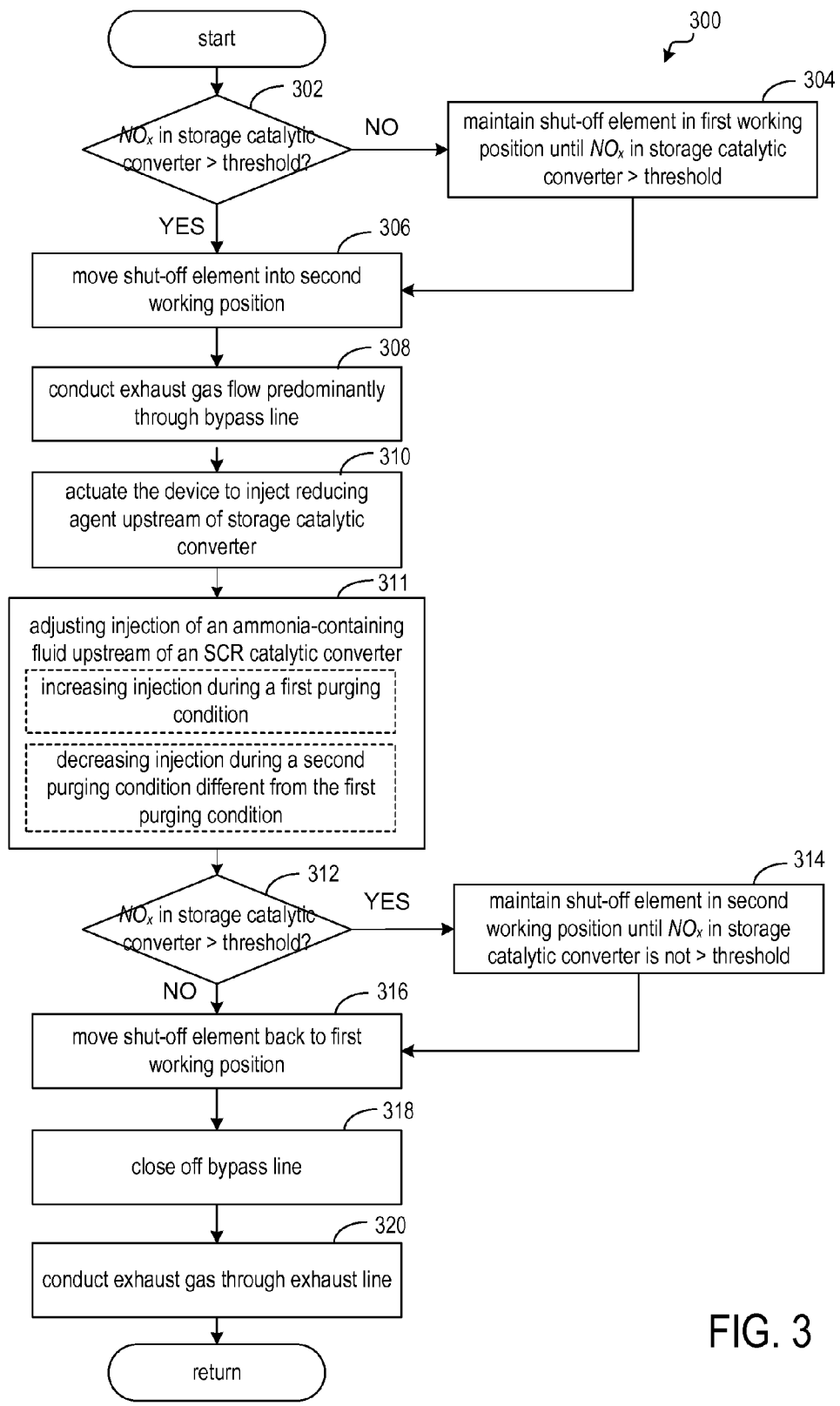
FIG. 3 diagrams a method of the present disclosure.

In reference to FIG. 3, a schematic diagram of a method in accordance with the present disclosure is depicted. The method 300 starts with an engine start and proceeds to box 302 where it is assessed if the level of nitrogen oxides $NO_x$ is greater than a threshold level. This determination can be made by a $NO_x$ sensor if present or by an estimation made by controller 12 based on input from additional sensors such as a linear oxygen sensor or UEGO (universal or wide-range exhaust gas oxygen), a two-state oxygen sensor or EGO (as depicted), a HEGO (heated EGO), HC, or CO sensor. Additionally, an estimation of $NO_x$ levels may be made based on operating conditions including engine speed, load, air-fuel ratio, operation time since last cleaning, etc. . . . .

If it is determined at 302 that the $NO_x$ level is below threshold (NO at 302) the method proceeds to 304, where the shut-off element 4b is maintained in its first working position in which bypass line 4a is completely blocked until the storage catalytic converter needs cleaning as indicated by a $NO_x$ level greater than threshold. Once the $NO_x$ level is greater than threshold at 304, or if at 302 the $NO_x$ level was determined to be greater than threshold (YES), the method proceeds to 306. At 306, the shut-off element 4b is moved into a second working position. With the shut-off element in the second working position exhaust gas-flow can be conducted predominantly through the bypass line 4a at 308. At 310, the device for introducing a reducing agent is actuated to inject reducing agent upstream of the storage catalytic converter. Steps 306, 308 and 310 act to purge a storage catalytic converter of stored NOx by diverting only a portion of incoming exhaust flow around the catalytic device while increasing injection of reductant to the device.

In the presence of reduced air flow and reduced oxygen content resulting from the shut-off element being in the second working position, injection of a reducing agent may have greater efficacy for reducing $NO_x$ within the storage catalytic converter. This may allow less reducing agent to be injected into the exhaust line. In an embodiment of the present disclosure the reducing agent may be fuel from the engine. Limiting the reducing agent needed for cleaning $NO_x$ may lead to greater fuel efficiency and fewer emissions. The amount of reducing agent injected may be determined by engine controller 12 based on a degree of $NO_x$ in the storage catalytic converter measured directly or by estimation based on operating conditions or input from additional sensors. Furthermore, the reductant injection may be based on an amount of the portion diverted, wherein the diverted portion of exhaust flow is recombined downstream of the storage catalytic converter. A lower portion of the exhaust flow diverted around the storage catalytic converter via bypass line 4a may result in a higher air flow speed and higher oxygen content in the storage catalytic converter in which a larger amount of reductant may be used to purge the storage catalytic converter of $NO_x$. Conversely, if a larger portion of exhaust flow is diverted around the storage catalytic converter air flow speed and available oxygen content may be lower and less reductant may be used. The portion of exhaust flow diverted around the storage catalytic converter may vary with engine conditions. Engine load, speed and air-fuel ratio may vary exhaust gas flow amount, temperature and composition producing differing catalytic needs which may result in engine controller 12 altering the shut-off element 4b to adjust diversion of exhaust flow in an embodiment where shut-off element 4b has variations of the second working position that allow for differing flow amount through bypass line 4a.

The method 300 proceeds to 311. At 311, responsive to the diverting, injection of an ammonia-containing fluid into recombined exhaust flow upstream of the SCR catalytic converter is adjusted. Adjusting injection of the ammonia-containing fluid includes increasing injection during a first purging condition, and decreasing injection during a second purging condition different from the first purging condition. In the first purging condition injection of the ammonia-containing fluid by the second device for introducing reducing agent 5a is increased. Increased injection of the ammonia-containing fluid may be beneficial to allow the SCR catalytic converter to reduce $NO_x$ in a first purging condition when for example, $NO_x$ emissions flowing to the SCR catalytic converter 5 exceeds its catalytic capacity. In the first purging condition this increase in $NO_x$ may result from decreased upstream reduction as much of the air flow is diverted around the storage catalytic converter. In the second purging condition injection of the ammonia-containing fluid is decreased. In the second purging condition less ammonia-containing fluid may be needed as unburned hydrocarbons which pass through the storage catalytic converter 4 resulting from injection, upstream of the storage catalytic converter, of reductant by the device for introducing a reducing agent 4c. These unburned hydrocarbons may serve as a reducing agent in the SCR catalytic converter 5 allowing the amount of ammonia-containing fluid to be reduced.

The first and second purging conditions may differ with the portion of flow diverted away from the storage catalytic converter via bypass line 4a. The first and second purging conditions may also result from differing engine conditions such as load, speed, air-fuel ratio, etc. . . . . . Engine controller 12 may determine how to adjust injection of the ammonia-containing fluid based on an estimate of the first or second purging condition. This estimation may be based on engine conditions, positioning of bypass valve 4b, and input from sensors such as a $NO_x$ sensor, UEGO, or other sensors. The ammonia-containing fluid may be urea, for example.

At 312, it is again assessed if the $NO_x$ level within the storage catalytic converter is greater than a threshold level. If the $NO_x$ level is above threshold at 312, the method proceeds to 314 where the shut-off element is maintained in the second working position, in which exhaust gas flow is conducted predominantly through the bypass line 4a, until the $NO_x$ level in the storage catalytic converter is below the threshold level. If, at 312, the $NO_x$ level is determined not to be greater than the threshold, or at 314, the $NO_x$ level has fallen below the threshold the method proceeds to 316. At 316, the shut-off element is moved back into the first working position. Resultantly, the bypass line 4a is closed off at 318 and exhaust gas flow is conducted through the exhaust line 2a at 320. The method then returns.

Embodiments of the method are advantageous in which:
fuel is used as reducing agent and introduced by means of the device, such that the exhaust gas conducted through the storage catalytic converter is enriched with fuel by means of an actuation of the device.

The provision of a device by means of which reducing agent or fuel which serves as reducing agent is introduced directly into the exhaust-gas discharge system or exhaust gas ensures that the internal combustion engine itself can be operated independently of a cleaning process of the storage catalytic converter, such that the cleaning process can occur at any engine speed or load. An HC enrichment of the exhaust gas by means of engine-internal measures may be realized as a supporting measure, but is not necessary. In particular, the internal combustion engine need not be switched to substoichiometric operation. Post-injections of fuel into the cylinders can be reduced in terms of quantity, or eliminated entirely by a method in accordance with the present disclosure. Exhaust-gas recirculation, and in the case of diesel engines throttling of the fresh air in the intake tract, constitute alternative engine-internal measures for additionally enriching the exhaust gas.

In this respect, in the internal combustion engine according to the disclosure, the local exhaust gas can be enriched with unburned hydrocarbons even at high load, when an HC enrichment of the exhaust gas by means of engine-internal measures is generally not possible owing to the high exhaust-gas temperatures. Greater flexibility in cleaning timing is also attained at low loads with the present disclosure. At low loads the engine-internal measures for HC enrichment may pose a risk to, or adversely affect the stability of combustion. These risks are avoided by local HC enrichment by injection directly into an exhaust line.

The exhaust-gas partial flow which passes through the storage catalytic converter serves as a carrier flow for the fuel introduced as reducing agent. The smaller the exhaust-gas partial flow is selected to be, the more effectively the fuel introduced can be utilized, and the less fuel is consumed, as a reduction of the carrier flow also results in a reduction of the absolute oxygen mass in the carrier flow.

Embodiments of the method are advantageous in which, during the cleaning of the storage catalytic converter, the internal combustion engine is enriched, proceeding from superstoichiometric operation ($\lambda>1$), by means of a reduction of the air ratio $\lambda$.

Conventionally, and within the context of the present disclosure, the air ratio $\lambda$ is defined as the ratio of the air mass $m_{air,act}$ actually supplied to the at least one cylinder to the stoichiometric air mass $m_{air,stoich}$ that would be required to completely oxidize the fuel mass $m_{fuel}$ supplied to the at least one cylinder (stoichiometric operation of the internal combustion engine $\lambda=1$). The following relationship applies:

$$\lambda=m_{air,act}/m_{air,stoich}$$

With the stoichiometric air demand $L_{stoich}=m_{air,stoich}/m_{fuel}$, the following applies for the air ratio $\lambda$:

$$\lambda=m_{air}/m_{fuel}*(1/L_{stoich})$$

As has already been stated, although engine-internal measures are not required for the purposes of the HC enrichment of the exhaust gas, they are nevertheless possible, if appropriate as an auxiliary measure.

Embodiments of the method are therefore also advantageous in which, during the cleaning of the storage catalytic converter, the exhaust gas of the internal combustion engine is additionally enriched with unburned hydrocarbons by means of at least one engine-internal measure.

Engine-internal measures for the enrichment of the exhaust gas with unburned hydrocarbons and carbon monoxide are substoichiometric operation with a lack of oxygen, exhaust-gas recirculation, the post-injection of fuel, and in the case of diesel engines, also throttling of the fresh air in the intake tract.

In the case of internal combustion engines in which an SCR catalytic converter is arranged in the exhaust-gas discharge system downstream of the second junction and a device for introducing reducing agent into the exhaust gas is provided upstream of the SCR catalytic converter, method variants are advantageous in which, for the reduction of the nitrogen oxides in the exhaust gas, during the cleaning of the storage catalytic converter, reducing agent is introduced into the exhaust gas by means of the device in order to reduce the nitrogen oxides in the exhaust gas conducted past the storage catalytic converter. Here, the device for introducing reducing agent is preferably arranged between the second junction and the SCR catalytic converter.

The nitrogen oxides in the exhaust gas, which nitrogen oxides are conducted via the bypass line through the exhaust-gas discharge system during the cleaning of the storage catalytic converter, are subjected to exhaust-gas aftertreatment downstream before the exhaust gas emerges into the environment. In the present case, there is provided for this purpose an SCR catalytic converter which may be supplied with reducing agent for the purpose of converting the nitrogen oxides.

The reducing agent may, as described above, be introduced directly into the exhaust-gas flow. The reducing agent may however also be generated in the form of ammonia during the cleaning of the LNT, such that the need for a separate device is eliminated. Furthermore, hydrocarbons passing through the LNT may also act as a reducing agent.

In the case of internal combustion engines in which an SCR catalytic converter is provided in the exhaust-gas discharge system downstream of the second junction, method variants are therefore also advantageous in which the reducing agent required by the SCR catalytic converter for the reduction of the nitrogen oxides in the storage catalytic converter is generated during the cleaning of the storage catalytic converter.

The present disclosure details an internal combustion engine having at least one cylinder which has at least one outlet opening for discharge of exhaust gases via an exhaust-gas discharge system, comprising: an exhaust line adjoining each outlet opening; and a storage catalytic converter for reduction of nitrogen oxides in the exhaust gas is arranged in the exhaust-gas discharge system; wherein, a bypass line for bypassing the storage catalytic converter is provided, the bypass line branches off from the exhaust-gas discharge system upstream of the storage catalytic converter so as to form a first junction and opens into the exhaust-gas discharge system again downstream of the storage catalytic converter so as to form a second junction; a device for introducing reducing agent into the exhaust-gas discharge system being provided between the first junction and the storage catalytic converter, and a shut-off element is provided for controlling the exhaust-gas mass flow conducted through the storage catalytic converter.

In addition to describing an exhaust gas discharge system featuring a bypass line and shut-off element that act to limit air flow through a storage catalytic converter in order to minimize reducing agent required for cleaning $NO_x$ from the storage catalytic converter, a method is provided detailing the cleaning process. The present disclosure utilizes known catalytic converters and fuel as a reducing agent. The configuration of bypass line and device for introducing reducing agent allows less fuel to be used to regenerate the storage catalytic converter. Furthermore, the reducing agent, fuel, is introduced directly into the exhaust line instead of into a combustion chamber of the internal combustion engine allowing for cleaning of the storage catalytic converter as needed, independent of engine operating conditions such as load, and engine speed.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine having at least one cylinder which has at least one outlet opening for discharge of exhaust gas via an exhaust-gas discharge system, comprising:
   an exhaust line adjoining each outlet opening;
   a storage catalytic converter for reduction of nitrogen oxides in the exhaust gas arranged in the exhaust-gas discharge system;
   a bypass line for bypassing the storage catalytic converter, the bypass line branching off from the exhaust-gas discharge system upstream of the storage catalytic converter so as to form a first junction and opens into the exhaust-gas discharge system again downstream of the storage catalytic converter so as to form a second junction;

a first device for introducing reducing agent into the exhaust-gas discharge system between the first junction and the storage catalytic converter;

a shut-off element for controlling the exhaust gas conducted through the storage catalytic converter;

an SCR catalytic converter for reducing the nitrogen oxides in the exhaust gas arranged in the exhaust-gas discharge system downstream of the second junction; and a second device for introducing an amount of ammonia into the exhaust-gas discharge system upstream of the SCR catalytic converter and downstream of the second junction;

wherein the amount of ammonia introduced is adjusted based on a level of NOx in the storage catalytic converter and further based on a portion of exhaust flow diverted around the storage catalytic converter.

2. The internal combustion engine as claimed in claim 1, wherein the first device for introducing reducing agent is a device for introducing fuel.

3. The internal combustion engine as claimed in claim 1, wherein the shut-off element is adjustable between a first working position, in which the bypass line is completely blocked, and a second working position, in which the exhaust gas is conducted predominantly through the bypass line.

4. The internal combustion engine as claimed in claim 1, wherein the shut-off element is arranged in the bypass line.

5. The internal combustion engine as claimed in claim 1, wherein the shut-off element is arranged at the first junction in the exhaust-gas discharge system.

6. The internal combustion engine as claimed in claim 1, wherein a particle filter for reducing particle emissions is arranged in the exhaust-gas discharge system downstream of the second junction.

7. The internal combustion engine as claimed in claim 6, wherein the particle filter is catalytically coated for oxidation of unburned hydrocarbons HC and carbon monoxide CO.

8. The internal combustion engine as claimed in claim 1, further comprising at least one exhaust-gas turbocharger, wherein a turbine of the at least one exhaust-gas turbocharger is arranged upstream of the first junction in the exhaust-gas discharge system.

9. A method for cleaning a storage catalytic converter of an exhaust gas discharge of an internal combustion engine system comprising:

responsive to a NOx amount in the storage catalytic converter greater than a threshold amount, moving a shut-off element from a first working position, in which a bypass line is blocked, into a second working position, in which exhaust gas is conducted predominantly through the bypass line;

enriching the exhaust gas which is conducted through the storage catalytic converter with a reducing agent by means of actuation of a device for introducing the reducing agent;

recombining exhaust gas conducted through the bypass with exhaust gas conducted through the storage catalytic converter downstream of the storage catalytic converter at a second junction; and injecting an ammonia-containing fluid into the recombined exhaust flow upstream of an SCR catalytic converter located downstream of the second junction, wherein an amount of the ammonia-containing fluid injected is adjusted based on a level of NOx in the storage catalytic converter and further based on a portion of exhaust flow diverted around the storage catalytic converter.

10. The method as claimed in claim 9, wherein, in the second working position, more than three quarters of the exhaust gas is conducted through the bypass line.

11. The method as claimed in claim 9, wherein, during a cleaning of the storage catalytic converter, the internal combustion engine is enriched, proceeding from superstoichiometric operation ($\lambda > 1$), by means of a reduction of the air-fuel ratio $\lambda$.

12. The method as claimed in claim 9, wherein, during the cleaning of the storage catalytic converter, the exhaust gas of the internal combustion engine is additionally enriched with unburned hydrocarbons by means of at least one engine-internal measure.

13. The method as claimed in claim 9, wherein, for reduction of nitrogen oxides in the exhaust gas during the cleaning of the storage catalytic converter, the reducing agent is introduced into the exhaust gas by means of the device for introducing the reducing agent.

14. The method as claimed in claim 9, wherein ammonia generated during the cleaning of the storage catalytic converter is used to reduce nitrogen oxides in the SCR catalytic converter.

15. A method, comprising:

purging a storage catalytic converter of stored NOx by diverting only a portion of incoming exhaust flow around the storage catalytic converter via a bypass while increasing injection of reductant to the storage catalytic converter;

recombining unreacted exhaust from the bypass with exhaust from the storage catalytic converter downstream of the storage catalytic converter; and adjusting injection of an ammonia-containing fluid into recombined exhaust flow upstream of an SCR catalytic converter based on a level of NOx in the storage catalytic converter and further based on the portion of exhaust flow diverted around the storage catalytic converter.

16. The method of claim 15, wherein the reductant injection is based on an amount of the portion of exhaust flow diverted around the storage catalytic converter.

17. The method of claim 16, wherein the adjusting injection of the ammonia-containing fluid is further based on a NOx level in the storage catalytic converter greater than a threshold level, the adjusting including increasing injection of ammonia during a first purging condition where a first, larger portion of exhaust flow is diverted around the storage catalytic converter, and decreasing injection of ammonia during a second purging condition different from the first purging condition where a second, smaller portion of exhaust flow is diverted around the storage catalytic converter.

* * * * *